United States Patent [19]

Mink et al.

[11] Patent Number: 5,470,812

[45] Date of Patent: Nov. 28, 1995

[54] HIGH ACTIVITY POLYETHYLENE CATALYSTS PREPARED WITH ALKOXYSILANE REAGENTS

[75] Inventors: Robert I. Mink, Warren; Thomas E. Nowlin, West Windsor, both of N.J.

[73] Assignee: Mobil Oil Corporation, Fairfax, Va.

[21] Appl. No.: 151,666

[22] Filed: Nov. 15, 1993

Related U.S. Application Data

[63] Continuation-in-part of Ser. No. 788,386, Nov. 6, 1991, Pat. No. 5,336,652.

[51] Int. Cl.$^6$ .................................................. B01J 31/12
[52] U.S. Cl. ........................................ 502/125; 502/120
[58] Field of Search ........................................ 502/125, 120

[56] References Cited

U.S. PATENT DOCUMENTS

| | | | |
|---|---|---|---|
| 3,787,384 | 1/1974 | Stevens et al. | 260/94.9 |
| 4,063,009 | 12/1977 | Ziegler et al. | 526/159 |
| 4,076,698 | 2/1978 | Anderson et al. | 526/348 |
| 4,113,654 | 9/1978 | Mayr et al. | 252/429 C |
| 4,148,754 | 4/1979 | Strobel et al. | 252/429 |
| 4,173,347 | 11/1979 | Graff | 252/429 |
| 4,212,961 | 7/1980 | Kobayashi et al. | 526/151 |
| 4,263,171 | 4/1981 | Shida et al. | 252/429 C |
| 4,302,566 | 11/1981 | Karol et al. | 526/125 |
| 4,335,016 | 6/1982 | Dombro | 335/429 |
| 4,374,753 | 2/1983 | Pullukat et al. | 252/429 |
| 4,378,304 | 3/1983 | Dombro | 252/429 |
| 4,381,252 | 4/1983 | Sakurai et al. | 252/429 B |
| 4,383,939 | 5/1983 | Johnstone | 252/429 B |
| 4,385,161 | 5/1983 | Caunt et al. | 526/114 |
| 4,396,533 | 8/1983 | Johnstone | 252/429 B |
| 4,397,762 | 8/1983 | Johnstone | 252/429 B |
| 4,402,861 | 9/1983 | Hoff | 252/429 B |
| 4,434,083 | 2/1984 | van de Leemput et al. | 502/154 |
| 4,458,058 | 7/1984 | Dombro | 526/129 |
| 4,478,988 | 10/1984 | Pullukat et al. | 526/128 |
| 4,481,301 | 11/1984 | Nowlin et al. | 502/104 |
| 4,497,906 | 2/1985 | Hanji et al. | 502/110 |
| 4,524,141 | 6/1985 | Pullukat et al. | 502/107 |
| 4,525,469 | 6/1985 | Ueda et al. | 502/125 |
| 4,525,557 | 6/1985 | Heilman et al. | 526/128 |
| 4,530,912 | 7/1985 | Pullukat et al. | 502/104 |
| 4,530,913 | 7/1985 | Pullukat et al. | 502/104 |
| 4,540,753 | 9/1985 | Cozewith et al. | 526/88 |
| 4,558,023 | 12/1985 | Brun et al. | 502/108 |
| 4,558,024 | 12/1985 | Best | 502/115 |
| 4,565,795 | 1/1986 | Short et al. | 502/110 |
| 4,565,796 | 1/1986 | Etherton | 502/112 |
| 4,567,243 | 1/1986 | Pullukat et al. | 526/128 |
| 4,578,440 | 3/1986 | Pullukat et al. | 526/128 |
| 4,611,038 | 9/1986 | Brun et al. | 526/169.2 |
| 4,656,151 | 4/1987 | Shelly et al. | 502/113 |
| 4,665,141 | 5/1987 | Aylward | 526/86 |
| 4,672,050 | 6/1987 | Sasaki et al. | 502/116 |
| 4,678,767 | 7/1987 | Tachikawa et al. | 502/104 |
| 4,690,991 | 9/1987 | Seppala | 526/158 |
| 4,704,376 | 11/1987 | Blenkers et al. | 502/104 |
| 4,711,865 | 12/1987 | Speca | 502/116 |
| 4,716,207 | 12/1987 | Cozewith et al. | 526/169.2 |
| 4,748,221 | 5/1988 | Collomb et al. | 526/153 |
| 4,754,007 | 6/1988 | Pullukat et al. | 526/130 |
| 4,771,023 | 9/1988 | Sasaki et al. | 502/116 |
| 4,786,697 | 11/1988 | Cozewith et al. | 526/88 |
| 4,804,794 | 2/1989 | Ver Strate et al. | 585/12 |
| 4,829,038 | 5/1989 | Hoppin et al. | 502/25 |
| 4,849,390 | 7/1989 | Sano et al. | 502/113 |
| 4,916,099 | 4/1990 | Sasaki et al. | 502/126 |
| 4,923,935 | 5/1990 | Sano et al. | 526/73 |
| 4,940,682 | 7/1990 | Sasaki et al. | 502/113 |
| 5,006,619 | 4/1991 | Pullukat et al. | 526/128 |
| 5,021,382 | 6/1991 | Malpass, Jr. | 502/117 |
| 5,023,223 | 6/1991 | Ebara et al. | 502/116 |
| 5,028,671 | 7/1991 | Kioka et al. | 526/125 |
| 5,034,465 | 7/1991 | Buehler et al. | 502/119 |
| 5,063,188 | 11/1991 | Malpass et al. | 502/116 |
| 5,064,799 | 11/1991 | Monte et al. | 502/115 |
| 5,106,926 | 4/1992 | Eisinger et al. | 526/88 |
| 5,112,785 | 5/1992 | Brun et al. | 502/108 |
| 5,130,283 | 7/1992 | Murata et al. | 502/116 |
| 5,143,883 | 9/1992 | Buehler et al. | 502/119 |
| 5,145,821 | 9/1992 | Buehler et al. | 502/119 |
| 5,147,839 | 9/1992 | Fujita et al. | 502/119 |
| 5,153,158 | 10/1992 | Kioka et al. | 502/126 |
| 5,177,043 | 1/1993 | Koyama et al. | 502/125 |
| 5,191,042 | 3/1993 | Cozewith | 526/144 |
| 5,194,531 | 3/1993 | Toda et al. | 526/125 |
| 5,221,650 | 6/1993 | Buehler | 502/104 |
| 5,227,355 | 7/1993 | Seppala et al. | 502/125 |
| 5,231,151 | 7/1993 | Spencer et al. | 526/116 |
| 5,231,355 | 7/1993 | Seppala et al. | 502/125 |
| 5,232,998 | 8/1993 | Buehler et al. | 526/125 |
| 5,244,853 | 9/1993 | Wang et al. | 502/116 |
| 5,258,342 | 11/1993 | Luciani et al. | 502/107 |
| 5,275,991 | 1/1994 | Buehler et al. | 502/107 |

FOREIGN PATENT DOCUMENTS

| | | |
|---|---|---|
| 0261808 | 3/1988 | European Pat. Off. . |
| 0306939 | 3/1989 | European Pat. Off. . |

OTHER PUBLICATIONS

WO 93/09147: Nowlin, Thomas; High Activity Polyethylene Catalysts Prepared with Alkoxysilane Reagents, May. 1993.

*Primary Examiner*—P. Achutamurthy
*Attorney, Agent, or Firm*—Alexander J. McKillop; Malcolm D. Keen; Marina V. Schneller

[57] ABSTRACT

An ethylene copolymerization catalyst is prepared by impregnating a porous support, such as silica, with an organomagnesium compound such as a magnesium alkyl and contacting the magnesium-containing support with a silane compound which is free of hydroxyl groups, such as a tetraalkyl orthosilicate, e.g. tetraethyl orthosilicate (TEOS). A transition metal component such as titanium tetrachloride is then incorporated into the support in a specific ratio to the magnesium and silane components. Activation of this catalyst precursor with a trialkylaluminum compound results in a catalyst which is effective for the production of ethylene copolymers.

17 Claims, No Drawings

HIGH ACTIVITY POLYETHYLENE CATALYSTS PREPARED WITH ALKOXYSILANE REAGENTS

CROSS-REFERENCE TO RELATED APPLICATION

This application is a continuation in part of application Ser. No. 07/788,386, filed Nov. 6, 1991, U.S. Pat. No. 5,336,652, which is relied upon and is expressly incorporated by reference herein.

FIELD OF THE INVENTION

The present invention relates to a method for polymerizing alpha-olefins, a catalyst for such a polymerization and a method for producing such a catalyst. A particular aspect of the present invention relates to a method for producing linear low density copolymers of ethylene, hereinafter referred to as "LLDPE".

Linear low density polyethylene polymers possess properties which distinguish them from other polyethylene polymers such as homopolymers of polyethylene. Certain of these properties are described in the Anderson et al U.S. Pat. No. 4,076,698.

BACKGROUND OF THE INVENTION

When the LLDPE resins are fabricated into injection-molded products, it is imperative to assure that such products are not susceptible to warping or shrinking. As is known to those skilled in the art, the degree of warping or shrinking can be predicted from the molecular weight distribution of the resins. Resins having a relatively narrow molecular weight distribution produce injection-molded products exhibiting a minimum amount of warping or shrinkage. Conversely, resins having a relatively broader molecular weight distribution produce injection-molded products more likely to undergo warping or shrinkage.

One of the measures of the molecular weight distribution of the resin is melt flow ratio (MFR), which is the ratio of high load melt index (HLMI or $I_{21}$) to melt index ($I_2$) for a given resin. MFR is defined herein as the ratio of the high load melt index (HLMI or $I_{21}$) divided by the melt index ($I_2$), i.e., $$MFR = \frac{I_{21}}{I_2}$$

The melt flow ratio is believed to be an indication of the molecular weight distribution of the polymer, the higher the value, the broader the molecular weight distribution. Resins having relatively low MFR values, e.g., of about 20 to about 50, have relatively narrow molecular weight distributions. Additionally, LLDPE resins having such relatively low MFR values produce films of better strength properties than resins with high MFR values.

By comparison, the molecular weight per se of the polymer may be controlled in a known manner, e.g., by using hydrogen. With the catalysts produced according to the present invention, molecular weight may be suitably controlled with hydrogen when the polymerization is carried out at relatively low temperatures, e.g., from about 30° to about 105° C. This control of molecular weight may be evidenced by a measurable positive change in melt index ($I_2$) of the polymer produced.

Another important property of an ethylene and alpha-olefin copolymerization catalyst composition is the ability thereof to effectively copolymerize ethylene with higher alpha-olefins, e.g., $C_3$-$C_{10}$ alpha-olefins, to produce resins having low densities. Such resins have important advantages, e.g., they are used to produce polyethylene film with excellent physical properties which is, therefore, substantially more resistant to tearing and puncturing than a film made from similar resins of higher densities. This property of the catalyst composition is referred to as "higher alpha-olefin incorporation property" and is usually measured by determining the amount of higher alphaolefin (e.g., butene, hexene or octene) required in the polymerization process, e.g. fluid-bed reactor process, to produce a copolymer of ethylene and the higher alpha-olefin having a given density. The lesser is the amount of the higher alpha-olefin required to produce a resin of a given density, the higher are the production rates and, therefore, the lower is the cost of producing such a copolymer. Catalysts having good higher alpha-olefin incorporation properties are referred to in the art as having a high alpha-olefin incorporation factor. High values of the high alpha-olefin incorporation factor are especially important in the gas-phase fluid bed process, because relatively high concentrations of higher alpha-olefin in the fluid-bed reactor may cause poor fluidization caused, e.g., by resin stickiness. Therefore, production rates must be significantly reduced to avoid such problems. Consequently, catalyst compositions with relatively high alpha-olefin incorporation factor values avoid these problems and are more desirable.

Accordingly, it is important to provide a catalyst composition capable of producing ethylene copolymers having relatively narrow molecular weight distributions (low MFR values) and low densities.

It is therefore a primary object of the present invention to provide a high activity catalyst for the polymerization of alpha-olefins yielding products of a relatively narrow molecular weight distribution.

It is an additional object of the present invention to provide a catalytic process for polymerizing alpha-olefins which yields linear low density polyethylene of a relatively narrow molecular weight distribution at high productivity.

SUMMARY OF THE INVENTION

A supported alpha-olefin polymerization catalyst composition of this invention is prepared in a multi-step process. In the first step, a mixture of a solid, porous carrier and a non-polar solvent is contacted with at least one organomagnesium compound of the formula $$R_m \, Mg \, R'_n$$

where R and R' are the same or different alkyl groups, preferably $C_4$-$C_{10}$ alkyl groups, more preferably $C_4$-$C_8$ alkyl groups, and most preferably both R and R' are butyl groups, and m and n are each 0, 1 or 2, providing that m+n is equal to the valence of Mg.

Subsequently, the mixture of the first step is contacted with at least one silane compound of formula, $$R^1_x SiR^2_y$$

wherein Si is a silicon atom; x is 1, 2, 3, or 4 and y is 0, 1, 2, or 3, provided that x+y is 4; $R^1$ is $R_w$—O— wherein O is an oxygen atom and $R_w$ is a hydrocarbyl group of 1 to 10 carbon atoms; and $R^2$ is a halogen atom, preferably chlorine, or a hydrocarbyl group of 1 to 10 carbon atoms, or a hydrogen atom. The mixture is then contacted with at least one transition metal compound soluble in the non-polar solvent. The resulting mixture is subsequently contacted with a trialkylaluminum compound.

The resulting activated catalyst composition has substantially higher productivity in the polymerization of alpha-olefins, and substantially improved higher comonomer (i.e., $C_3$-$C_{10}$ alpha-olefin) incorporation properties, than similar catalyst compositions prepared without the silane compound. The catalyst also produces polymers having relatively narrow molecular weight distributions and low densities.

DETAILED DESCRIPTION

In accordance with an aspect of the present invention, supported titanium is incorporated onto a suitable support by impregnating this support with reactive magnesium and utilizing this supported reactive magnesium to react with tetravalent titanium (i.e., titanium in the plus 4 valence state) in a liquid medium. Unreacted titanium is soluble in this liquid medium, while reacted titanium and supported reactive magnesium are insoluble in this liquid medium.

As used herein, the concept of supporting a material on a carrier is intended to connote the incorporation of material (e.g., magnesium compounds and/or titanium compounds) onto the carrier by physical or chemical means. Accordingly, supported material need not necessarily be chemically bound to the carrier.

Catalysts produced according to aspects of the present invention may be described in terms of the manner in which they can be made. More particularly, these catalysts can be described in terms of the manner in which a suitable carrier may be treated in order to form such catalysts.

Suitable carrier materials which may be treated include solid, porous carrier materials such as silica, alumina and combinations thereof. Such carrier materials may be amorphous or crystalline in form. These carriers may be in the form of particles having a particle size of from about 0.1 micron to about 250 microns, preferably from 10 to about 200 microns, and most preferably from about 10 to about 80 microns. Preferably, the carrier is in the form of spherical particles, e.g., spray dried silica.

The carrier material is also porous. The internal porosity of these carriers may be larger than 0.2 cm$^3$/g. The specific surface area of these carriers is at least 3 m$^2$/g, preferably at least about 50 m$^2$/g, and more preferably from, e.g., about 150 to about 1500 m$^2$/g.

It is desirable to remove physically bound water from the carrier material prior to contacting this material with water-reactive magnesium compounds. This water removal may be accomplished by heating the carrier material to a temperature from about 100° C. to an upper limit of temperature represented by the temperature at which change of state or sintering occurs. A suitable range of temperatures may, thus, be from about 100° C. to about 800° C., e.g., from about 150° C. to about 650° C.

Silanol groups represented by the presence of Si-OH groups in the carrier, may be present when the carrier is contacted with water-reactive magnesium compounds in accordance with an aspect of the present invention. These Si-OH groups may be present at about 0.3 mmoles or more per gram of carrier. Accordingly, an amount of, e.g., from about 0.5 to about 5 mmoles of OH groups per gram of carrier may be present, but a preferred range is from about 0.3 to about 0.9 mmoles of OH groups per gram of carrier.

Excess OH groups present in the carrier may be removed by heating the carrier for a sufficient time at a sufficient temperature to accomplish the desired removal. More particularly, for example, a relatively small number of OH groups may be removed by sufficient heating at from about 150° C. to about 250° C., whereas a relatively large number of OH groups may be removed by sufficient heating at least 500° to 800° C., most especially, from about 550° C. to about 650° C. The duration of heating may be overnight, e.g., 16 hours or a shorter period, e.g., at least 4 hours. In a most preferred embodiment, the carrier is silica which, prior to the use thereof in the first catalyst synthesis step, has been dehydrated by fluidizing it with nitrogen or air and heating at least about 600° C. for about 4–16 hours to achieve a surface hydroxyl group concentration of about 0.7 millimoles per gram. The surface hydroxyl concentration of silica may be determined according to J. B. Peri and A. L. Hensley, Jr., *J. Phys. Chem.*, 72 (8), 2926 (1968). The silica of the most preferred embodiment is a high surface area, amorphous silica (surface area=300 m$^2$/g; pore volume of 1.65 cm$^3$/g), and it is a material marketed under the tradenames of Davison 952 or Davison 955 by the Davison Chemical Division of W. R. Grace and Company. When silica has been dehydrated by fluidizing with nitrogen or air and heated at about 600° C. for about 4–16 hours, then the surface hydroxyl concentration is about 0.72 mmols/g. The silica used may be a high surface area, amorphous silica (surface area=300 m$^2$/g; pore volume of 1.65 cm$^3$ per gram) marketed under the tradename Davison 952 by the Davison Division of W. R. Grace and Co.

While heating is a preferred means of removing OH groups inherently present in a carrier such as silica, other removal means are also possible such as chemical means. For example, a desired proportion of OH groups may be reacted with a chemical agent such as a hydroxyl reactive aluminum compound, e.g., triethylaluminum.

Other examples of suitable carrier materials are described in the Graff, U.S. Pat. No. 4,173,547. Note particularly the passage extending from column 3, line 62 to column 5, line 44 of this Graff patent. It is noted that internal porosity of carriers can be determined by a technique termed BET-technique, described by S. Brunauer, P. Emmett and E. Teller in *Journal of the American Chemical Society*, 60, pp. 209–319 (1938). Specific surface areas of carriers can also be measured in accordance with the above-mentioned BET-technique, with use of the standardized method as described in British Standards BS 4359, Volume 1, (1969).

The carrier material is slurried in a non-polar solvent and the resulting slurry is contacted with at least one organomagnesium compound. The slurry of the carrier material in the solvent is prepared by introducing the carrier into the solvent, preferably while stirring, and heating the mixture to about 25° to about 100° C., preferably to about 40° to about 65° C. The slurry is then contacted with the aforementioned organomagnesium compound, while the heating is continued at the aforementioned temperature.

The organomagnesium compound has the empirical formula

$$R_m \, Mg \, R'_n$$

where R and R' are the same or different $C_2$-$C_{12}$ alkyl groups, preferably $C_4$-$C_{10}$ alkyl groups, more preferably $C_4$-$C_8$ alkyl groups, and most preferably both R and R' are butyl groups, and m and n are each 0, 1 or 2, providing that m+n is equal to the valence of Mg.

Suitable non-polar solvents are materials in which all of the reactants used herein, e.g., the organomagnesium compound, silane compound, and the transition metal compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene and ethylbenzene, may also be employed. The most preferred non-polar solvent is isopentane. Prior to use, the non-polar solvent should be purified, such as by percolation through silica gel and/or molecular sieves, to remove traces of water, oxygen, polar compounds, and other materials capable of adversely affecting catalyst activity.

In the most preferred embodiment of the synthesis of this catalyst it is important to add only such an amount of the organomagnesium compound that will be deposited—physically or chemically—onto the support since any excess of the organomagnesium compound in the solution may react with other synthesis chemicals and precipitate outside of the support. The carrier drying temperature affects the number of sites on the carrier available for the organomagnesium compound—the higher the drying temperature the lower the number of sites. Thus, the exact molar ratio of the organomagnesium compound to the hydroxyl groups will vary and must be determined on a case-by-case basis to assure that only so much of the organomagnesium compound is added to the solution as will be deposited onto the support without leaving any excess of the organomagnesium compound in the solution. Furthermore, it is believed that the molar amount of the organomagnesium compound deposited onto the support is greater than the molar content of the hydroxyl groups on the support. Thus, the molar ratios given below are intended only as an approximate guideline and the exact amount of the organomagnesium compound in this embodiment must be controlled by the functional limitation discussed above, i.e., it must not be greater than that which can be deposited onto the support. If greater than that amount is added to the solvent, the excess may react with the reagents added subsequently, thereby forming a precipitate outside of the support which is detrimental in the synthesis of our catalyst and must be avoided. The amount of the organomagnesium compound which is not greater than that deposited onto the support can be determined in any conventional manner, e.g., by adding the organomagnesium compound to the slurry of the carrier in the solvent, while stirring the slurry, until the organomagnesium compound is detected in the solvent.

For example, for the silica carrier heated at about 600° C., the amount of the organomagnesium compound added to the slurry is such that the molar ratio of Mg to the hydroxyl groups (OH) on the solid carrier is about 1:1 to about 4:1, preferably about 1.1:1 to about 2.8:1, more preferably about 1.2:1 to about 1.8:1 and most preferably about 1.4:1. The organomagnesium compound dissolves in the non-polar solvent to form a solution from which the organomagnesium compound is deposited onto the carrier.

It is also possible to add such an amount of the organomagesium compound which is in excess of that which will be deposited onto the support, and then remove, e.g., by filtration and washing, any excess of the organomagnesium compound. However, this alternative is less desirable than the most preferred embodiment described above.

It is noted that if the organomagnesium compound is only sparingly soluble, e.g., to the extent of even 1 percent or less, reactive organomagnesium which is consumed by reactive sites on the carrier will be replaced by further dissolution of undissolved organomagnesium by a mass action effect.

The amount of magnesium compound which is impregnated onto the carrier should be sufficient to react with the silane compound and then the tetravalent titanium compound in order to incorporate a catalytically effective amount of titanium on the carrier in the manner set forth hereinbelow. When a liquid containing an organomagnesium compound is contacted with a carrier, the amount of magnesium in this liquid in terms of mmoles may be essentially the same as that stated above with respect to that which is impregnated onto the carrier.

An essential component in the production of the catalyst composition of the invention is a silane compound which is free of hydroxy groups. The preferred species of silane compound are those defined by $Si(OR)_4$ wherein R is a $C_1-C_{10}$ hydrocarbyl group, [preferably a hydrocarbyl group of 2 to 6 carbon atoms.] Hydrocarbyl groups include alkyl, aryl, arylalkyl, alkenyl and arylalkenyl, containing 1 to 10 carbon atoms. Specific silane compounds which can be used in accordance with the invention include tetramethoxysilane, tetraethoxysilane, tetraisopropoxysilane, tetrapropoxysilane, tetrabutoxysilane, tetraphenoxysilane, tetrakis(2-methoxyethoxy)silane, tetrakis(2-ethylhexoxy)silane, and tetraallyloxysilane.

The slurry of the carrier material and of the organomagnesium compound in the solvent is maintained at temperatures of about 40° to about 65° C., before the introduction of the silane compound. The silane compound is introduced after organomagesium incorporation and preferably before transition metal incorporation into the catalyst. The amount of the silane compound added to the slurry is such that the molar ratio of the silane compound to Mg on the solid carrier is about 0.40 to about 1.00, preferably about 0.50 to about 0.80, more preferably about 0.55 to about 0.75 and most preferably about 0.66.

The slurry is contacted with at least one transition metal compound soluble in the non-polar solvent, preferably, after the addition of the silane compound is completed. This synthesis step is conducted at about 25° to about 70° C., preferably at about 30° to about 65° C., and most preferably at about 45° to about 60° C. In a preferred embodiment, the amount of the transition metal compound added is not greater than that which can be deposited onto the carrier. The exact molar ratio of Mg to the transition metal and of the transition metal to the hydroxyl groups of the carrier will therefore vary (depending, e.g., on the carrier drying temperature) and must be determined on a case-by-case basis. For example, for the silica carrier heated at about 200° to about 850° C., the amount of the transition metal compound is such that the molar ratio of the transition metal, derived from the transition metal compound, to the hydroxyl groups of the carrier is about 1 to about 2.0, preferably about 1.3 to about 2.0. The amount of the transition metal compound is also such that the molar ratio of Mg to the transition metal is about 0.5 to about 3, preferably about 1 to about 2. These molar ratios appear to produce a catalyst composition which produces resins having relatively low melt flow ratio values of about 20 to about 30. Catalysts of the invention allow for the production of LLDPE of MFR values less than 27, preferably in the range of greater than 20 and less than 27. These LLDPE products exhibit excellent dart drop impact resistance and enhanced MD Elmendorf tear strength. As is known to those skilled in the art, such resins can be utilized to produce high strength films or injection molding products which are resistant to warping and shrinking.

Suitable transition metal compounds used herein are compounds of metals of Groups IVA, VA, VIA or VIII of the Periodic Chart of the Elements, as published by the Fisher Scientific Company, Catalog No. 5-702-10, 1978 providing that such compounds are soluble in the non-polar solvents.

The preferred transition metal compounds are titanium compounds, preferably tetravalent titanium compounds. The most preferred titanium compound is titanium tetrachloride. Mixtures of transition metal compounds may also be used and generally no restrictions are imposed on the transition metal compounds which may be included. Any transition metal compound that may be used alone may also be used in conjunction with other transition metal compounds.

The reaction of the transition metal compound, such as the tetravalent titanium compound, in the liquid medium conveniently takes place by slurrying the magnesium-containing solid carrier in a solution of the tetravalent titanium compound and heating the liquid reaction medium to a suitable reaction temperature, e.g., to the reflux temperature of the solvent at standard atmospheric pressure. Thus, the reaction may take place under reflux conditions. Preferred solvents for the tetravalent titanium compound are hexane or isopentane.

In accordance with preferred embodiments of the invention, the proportions of the components of the catalyst precursor of the invention satisfy the equation of $$K = \frac{[Ti]}{[Mg] + n[Si]},$$

less than 0.4 and preferably 0.23 to 0.31 (and n is 4). Outside of this range of values for K, K=0.23 to 0.31, the toughness of the resins, produced in polymerization and copolymerizations catalyzed by the catalysts of the invention, and the strength of the films fabricated therefrom decline. The "[Ti]", "[Mg]" and "[Si]" in the formula refer to the concentration of Ti (provided by the transition metal compound, e.g. TIC14); magnesium concentration provided by the organomagnesium compound and silicon provided by the silane compound. The concentration of each is calculated in units of mmole/gram silica support, for use in the formula for K.

The supported catalyst precursor formed from the four components described above is then activated with suitable activators. Suitable activators include organometallic compounds. Preferably, the activators are trialkylaluminum compounds which contain alkyl groups of 1 to 6 carbon atoms, preferably of 1 to 4. More preferably, the activators are triethylaluminum or trimethylaluminum. The most active catalyst is formed with the activator trimethylaluminum.

The catalyst may be activated in situ by adding the activator and catalyst precursor separately to the polymerization medium. It is also possible to combine the catalyst precursor and activator before introduction into the polymerization medium, e.g., for up to about 2 hours at a temperature from about –40° to about 80° C.

A suitable activating amount of the activator may be used. The number of moles of activator per gram atom of titanium in the catalyst may be, e.g., from about 1 to about 100 and is preferably greater than about 5.

Alpha-olefins may be polymerized with the catalysts prepared according to aspects of the present invention by any suitable process. Such processes include polymerizations carried out in suspension, in solution or in the gas phase. Gas phase polymerizations are preferred such as those taking place in stirred bed reactors and, especially, fluidized bed reactors.

The molecular weight of the polymer may be controlled in a known manner, preferably by using hydrogen. With the catalysts produced according to aspects of the present invention, molecular weight may be suitably controlled with hydrogen when the polymerization is carried out at relatively low temperatures, e.g., from about 30° to about 105° C. This control of molecular weight may be evidenced by a measurable positive change in melt index ($I_2$) for the polymer produced.

The catalysts prepared according to aspects of the present invention are highly active and may have an activity of at least from about 3,000 to about 10,000 in terms of grams of polymer produced per hour per gram of catalyst per 100 psi of ethylene pressure.

The catalysts prepared according to aspects of the present invention are particularly useful for the production of linear low density polyethylene polymers. Such linear low density polyethylene polymers may have a density of 0.94 g/cc or less, preferably 0,930 or less or even 0.925 g/cc or less. In accordance with certain aspects of the present invention, it is possible to achieve densities of less than 0.915 g/cc and even 0.900 g/cc or less.

Advantageous properties of linear low density polyethylene polymers are described in the Anderson et al U.S. Pat. No. 4,076,698. These linear low density polyethylene polymers may be polymers of ethylene with one or more $C_3$-$C_{10}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/4-methyl-1-pentene copolymers, ethylene/1-butene/1-hexene terpolymers, ethylene/propylene/1-hexene terpolymers and ethylene/propylene/1-butene terpolymers. When propylene is employed as a comonomer, the resulting linear low density polyethylene polymer preferably has at least one other alphaolefin comonomer having at least four carbon atoms in an amount of, e.g., at least 1 percent by weight of the polymer. Accordingly, ethylene/propylene copolymers are possible, but not preferred.

The molecular weight distribution of the polymers prepared in the presence of the catalysts of the present invention, as expressed by the MFR values, varies from about 20 to 30, preferably about 24–28, for LLDPE products having a density of about 0.900 to about 0.940 g/cc, and an 12 (melt index) of about 0.1 to about 100. As is known to those skilled in the art, such MFR values are indicative of a relatively narrow molecular weight distribution of the polymer. As is also known to those skilled in the art, such MFR values are indicative of polymers especially suitable for injection molding applications since polymers having such MFR values exhibit relatively low amounts of warpage and shrinkage on cooling of the injection molded products. The relatively low MFR values of polymers prepared with the catalysts of this invention also indicate that they are suitable for the preparation of various film products since such films are likely to have excellent strength properties. MFR is defined herein as the ratio of the high load melt index (HLMI or $I_{21}$) divided by the melt index ($I_2$), i.e., $$MFR = \frac{I_{21}}{I_2}$$

Low MFR values indicate relatively narrow molecular weight distribution polymers.

The linear low density polyethylene polymers produced in accordance with certain aspects of the present invention preferably contain at least about 80 percent by weight of ethylene units. Most preferably, the linear low density copolymers of the invention contain at least 2 weight percent, for example from 2 to 20 weight percent of an alpha olefin copolymerized therein.

A particularly desirable method for producing linear low density polyethylene polymers, according to an aspect of the present invention, is via a fluid bed reactor. Such a reactor and means for operating same is described in the Levine et al U.S. Pat. No. 4,011,382 or the Karol et al U.S. Pat. No. 4,302,566, each of which is relied upon and incorporated by reference herein. The activity of the catalyst produced in accordance with certain aspects of the present invention is sufficient to produce a linear low density polyethylene polymer which is an ethylene/1-hexene copolymer, e.g., having a density of less than 0.940 g/cc, in such a fluid bed reactor.

As described in the Karol et al U.S. Pat. No. 4,302,566, incorporated by reference herein, relating to a gas phase, fluid bed polymerization, the polymerization reaction is conducted by contacting a stream of the monomers, in a gas phase process, such as in the fluid bed process described below, and substantially in the absence of catalyst poisons such as moisture, oxygen, CO, $CO_2$, and acetylene with a catalytically effective amount of the completely activated catalyst at a temperature and at a pressure sufficient to initiate the polymerization reaction.

In order to achieve the desired density ranges in the copolymers it is necessary to copolymerize enough of the alphaolefin comonomers with ethylene to achieve a level of 1 to 5 mol percent of the $C_3$ to $C_8$ comonomer in the copolymer. The amount of comonomer needed to achieve this result will depend on the particular comonomer(s) employed.

In accordance with the invention, it has unexpectedly been found that using a gas phase catalytic polymerization reaction, 1-hexene can be incorporated into an ethylene polymer chain with high efficiency. In other words, a relatively small concentration of 1-hexene monomer in the gas phase reactor can lead to a relatively large incorporation of 1-hexene into the polymer. Thus, 1-hexene can be incorporated into an ethylene polymer chain in a gas phase reactor in amounts up to 15 percent by weight, preferably 4 to 12 percent by weight, to produce linear low density polyethylene having a density of less than 0.940 g/cc. The reaction is preferably conducted in a fluid bed reactor using the catalyst according to the invention.

It is essential to operate the fluid bed reactor at a temperature below the sintering temperature of the polymer particles. For the production of ethylene copolymers in the process of the present invention an operating temperature of about 30° to 115° C. is preferred, and a temperature of about 75° to 95° C. is most preferred. Temperatures of about 75° to 90° C. are used to prepare products having a density of about 0.91 to 0.92, and temperatures of about 80° to 100° C. are used to prepare products having a density of about 0.92 to 0.94, and temperatures of about 90° to 115° C. are used to prepare products having a density of about 0.94 to 0.96.

The fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The partially or completely activated catalyst is injected into the bed at a rate equal to its consumption. The production rate of the bed is controlled by the rate of catalyst injection. The production rate may be increased by simply increasing the rate of catalyst injection and decreased by reducing the rate of catalyst injection.

Since any change in the rate of catalyst injection will change the rate of generation of the heat of reaction, the temperature of the recycle gas is adjusted upwards or downwards to accommodate the change in rate of heat generation. This insures the maintenance of an essentially constant temperature in the bed.

The highly active supported catalyst system of this invention appears to yield a fluid bed product having an average particle size between about 0.01 to about 0.07 inches and preferably about 0.02–0.04 inches.

The feed stream of gaseous monomer, with or without inert gaseous diluents, is fed into the reactor at a space time yield of about 2 to 10 pounds/hour/cubic foot of bed volume.

The resins produced with catalysts of the invention exhibit excellent mechanical properties. Although there may be differences in catalyst productivity and hexene incorporation, which vary with the exact identity of the trialkylaluminum activator or cocatalyst (activator and cocatalyst are used interchangeably herein), used in the gas phase fluid bed reactor, the excellent mechanical properties of the LLDPE resins inhere in the precursor, as films of these resins exhibit unexpected toughness and strength, independently of the identity of the cocatalyst.

Films produced from the resins exhibit unexpected toughness and strength. Films of these resins, of for example LLDPE, are produced by compounding on a Banbury mixer with a high strength additive package, and blown into film on a 2.5 inch Brampton extruder at standard conditions (2:1 BUR, 430 degrees F, 100 mil die gap, 150 lb/hr). Specifically, films of LLDPE exhibit unexpectedly improved impact strength, dart drop impact strength, and enhanced MD Elmendorf tear strength, for example, compared to commercial standards.

Films having especially desirable properties may be formed with the above-mentioned ethylene/hexene copolymers by a variety of techniques. For example, desirable blown films as well as slot cast films may be formed.

Blown films formed from ethylene/hexene copolymers having a density from 0.916 to 0.928 g/cc may have especially desirable properties for bag structures. For example, such blown films may be fabricated into trash bag structures which, when loaded to capacity, resist breaking when dropped from a height of, e.g., four feet. A particular example of a blown film formed from an ethylene/hexene copolymer having a density of 0.918 and a melt index of 1 (ASTM D-1238, condition E), which is, in turn, formed in a gas phase, fluid bed reactor with a catalyst according to the present invention, is a blown film having an improved dart impact strength and enhanced MD Elmendorf tear strength.

Slot cast films formed from low density ethylene/hexene copolymers having a density of from about 0.916 to about 0.92 may have especially desirable properties as pallet stretch wrap. For example, such stretch wrap may hold loads together and onto pallets and resist breaking when subjected to forces encountered in loading operations where loads are moved about, dropped, etc. A particular example of a slot cast film formed from an ethylene/hexene copolymer having a density of about 0.918 and a melt index of 1.7 (ASTM D-1238, condition E), which is, in turn, formed in a gas phase, fluid bed reactor with a catalyst according to the present invention, is a slot cast film having a thickness of 1 mil, an improved MD Elmendorf tear strength.

The following Examples give examples of reactants and parameters which may be used in accordance with aspects of the present invention.

EXAMPLES

Example A—Catalyst Precursor Preparation

All manipulations were conducted under a nitrogen atmosphere by using standard Schlenk techniques. Into a 200 ml Schlenk flask was placed 7.0 grams of Davison grade 955 silica, which was previously dried under a nitrogen purge at 600° C. for about 16 hours. Hexane (90 ml) was added to the silica. Dibutylmagnesium (7.0 mmol) was added to the stirred slurry at 50°–55° C. and stirring was continued for one hour. Tetraethyl orthosilicate (TEOS, 4.6 mmol) was added to the slurry (50°–55° C.) and stirring was continued for one hour. TiCl$_4$ (7.0 mmol) was added to the reaction flask (50°–55° C.) and stirring was continued for an additional hour. Hexane was then removed by distillation with a nitrogen purge at 50°–55° C. Yield was 10.0 grams and the weight percent of Ti was 3.27.

Example B—Polymerization

Ethylene/1-hexene copolymers were prepared with the catalysts of Example A and a typical example is shown below.

Polymerization

A 1.6 liter stainless steel autoclave under a slow nitrogen purge at 50° C. was filled with dry heptane (500 ml) and 1-hexene (250 ml) and 3.0 mmol of cocatalyst was added. The reactor was closed, the stirring was increased to 900 rpm, and the internal temperature was increased to 85° C. The internal pressure was raised 12–20 psi with hydrogen. Ethylene was introduced to maintain the total pressure at about 120 psig. The internal temperature was decreased to 80° C., 10.0–30 mg of catalyst precursor was introduced into the reactor with ethylene overpressure, and the internal temperature was increased and held at 85° C. The polymerization was continued for 60 minutes, and then the ethylene supply was stopped and the reactor was allowed to cool. The polyethylene was collected and air dried.

Catalyst productivities, polymer flow indexes and melt flow ratios (MFR, $I_{21}/I_2$), and mole % hexene in polymer are tabulated in TABLE A below. Catalyst productivities are given in units of gram of polymer/gram of catalyst-hr-100 psi ethylene.

The data show that alkoxysilane-based catalysts are much more active compared to the control catalyst.

Polymers from the alkoxysilane-based catalysts have a much narrower molecular weight distribution compared to that of the control as evident from their much lower MFR values.

TABLE A*

| Silane Reagent | Productivity | Flow Index | 1-Hexene Mole % | MFR $I_{21}/I_2$ |
|---|---|---|---|---|
| None | 1830 | 23.5 | 2.7 | 41.5 |
| TEOS | 4200 | 18.5 | 3.4 | 25.8 |
| TBOS | 6850 | 21.0 | 3.3 | 26.0 |

*Catalyst precursor involved 0.66 mmol silane reagent/g silica. Cocatalyst was trimethylaluminum (TMA).
Productivity is given in units of g polymer/g catalyst-h-100 psi ethylene.
TEOS = tetraethyl orthosilicate
TBOS = tetrabutyl orthosilicate Example C The amount of silane reagent appears to be critical in achieving a balance between the copolymerization product properties and activity. This is evidenced in Table B below.

TABLE B

| Data Point | mmol TEOS/G silica | K col. 2, line 55 | MFR | Productivity |
|---|---|---|---|---|
| 1 | 0.44 | 0.36 | 30 | 6500 |
| 2 | 0.55 | 0.31 | 28 | 5750 |
| 3 | 0.66 | 0.27 | 26 | 4200 |
| 4 | 1.32 | 0.16 | 25 | 2600 |

Cocatalyst was TMA.
Catalyst precursors were prepared according to Example A, except different amounts of TEOS were used per gram of silica.
Productivity is given in units of g Polymer/g catalyst-h-100 psi ethylene.

The data show that at low TEOS levels (data point 1), polymer MFR is too high and, therefore, the catalyst is unacceptable. As TEOS level is increased, MFR decreases, but activity decreases. At the TEOS level of 1.32 mmol/g silica (data point 4), activity is unacceptable. Hence, for the catalysts of the invention the TEOS level needs to be controlled over a relatively narrow range to balance MFR and catalyst activity. The TEOS range is from about 0.55–0.90 mmol/g silica, with 0.60–0.78 most preferred, for premium film products.

Example D

The cocatalyst triisobutylaluminum (TIBA) was tested with a catalyst precursor of the invention and compared to results in catalysis in which the cocatalyst was TEAL (triethylaluminum) and TMA (trimethylaluminum) cf. Table C. The catalyst precursor was prepared according to Example A except 0.69 mmol TEOS/g silica was used. Polymerization conditions are given in Example B.

TABLE C

| COCATALYST | RELATIVE PRODUCTIVITY | 1-HEXENE mole % | FLOW INDEX $I_{21}$ |
|---|---|---|---|
| TIBA | 0.58 | 2.45 | 5.7 |
| TEAL | 1.00 | 2.70 | 13.7 |
| TMA | 1.22 | 2.95 | 10.0 |

The data clearly show that the catalyst system consisting of the catalyst precursor and the cocatalyst TIBA is much less active and incorporates less 1-hexene (2.45 mol%) into the polymer than the catalysts produced with TEAL or TMA as cocatalyst. The combination of less activity and poorer 1hexene reactivity with TIBA as cocatalyst would lead to process limitations in a fluid bed reactor for the preparation of LLDPE.

In Table D, the effect of precursor synthesis temperature on MFR of product is illustrated. Catalyst precursors prepared at a high temperature (88° C.) yield resins with an unacceptably high MFR value.

TABLE D

| PREPARATION TEMP. °C. | PRODUCT MFR $I_{21}/I_2$ |
|---|---|
| 55 | 26 |
| 88 | 28 |

Example E

Under the conditions of Example A, except different amounts of TEOS were used per gram of silica, additional catalyst precursors were prepared and activated with triethylaluminum.

| Catalyst | TEOS mmol/g silica |
|---|---|
| E 1 | 0.44 |
| E 2 | 0.55 |
| E 3 | 0.66 |
| E 4 | 1.32 |

All the above catalysts have been scaled up from laboratory scale but only Catalyst E 3 exhibits the unexpected combination of properties of activity, and of MFR control for tough film product, as measured by DDI and MD Elmendorf.

Thus it is apparent that there has been provided, in accordance with the invention, a composition which is effective to form copolymers of ethylene, that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A catalyst composition for copolymerizing ethylene and an alpha olefin of 3 to 10 carbon atoms, comprising a catalyst precursor and a trialkylaluminum cocatalyst to activate said catalyst precursor, wherein the improvement comprises a precursor comprising (i) silica, wherein the silica has 0.4 to 0.9 mmoles of OH groups per gram of silica;
   (ii) dibutylmagnesium, in an amount to provide a molar ratio of Mg:OH of 1.0 to 1.8
   (iii) tetraethyl orthosilicate, in an amount to provide a tetraethyl orthosilicate:Mg molar ratio of 0.50 to 0.80;
   (iv) and TiCl$_4$, in an amount to provide a molar ratio of Ti:Mg of 0.7 to 1.4 wherein the catalyst precursor has a K value, which is defined as $$K = \frac{[Ti]}{[Mg] + 4[Si]},$$

wherein is titanium metal concentration provided by TiCl$_4$, is magnesium metal concentration provided by said dibutylmagnesium; is the concentration provided by said tetraethyl orthosilicate, and K is 0.23 to 0.31 wherein concentration of each of, and is in units of mmole/gram silica support; and wherein the precursor is prepared at a temperature in the range of 40° to 65° C.

2. A catalyst of claim 1, wherein the precursor is formed by the steps comprising (a) providing a slurry of silica, in a non-polar solvent, wherein the silica has 0.4 to 0.9 mmoles of OH groups per gram of silica;
   (b) contacting said silica with said dibutylmagnesium in an amount to provide a molar ratio of Mg:OH of 1.0 to 1.8, to impregnate said silica, and to form a step (b) product slurry;
   (c) adding, to said step (b) product slurry, tetraethyl orthosilicate, in an amount to provide a tetraethyl orthosilicate:Mg molar ratio of 0.50 to 0.80, and to form a step (c) product slurry;
   (d) contacting said step (c) product slurry with TiCl$_4$, in an amount to provide a molar ratio of Ti:Mg of 0.7 to 1.4 to form said catalyst precursor; wherein each of (b), (c) and (d) is undertaken at a temperature in the range of 40° to 65° C.

3. A catalyst composition for copolymerizing ethylene and an alpha olefin of 3 to 10 carbon atoms, comprising a catalyst precursor and a trialkylaluminum cocatalyst to activate said catalyst precursor, wherein the precursor comprises (i) silica, wherein the silica has 0.4 to 0.9 mmoles of OH groups per gram of silica;
   (ii) dibutylmagnesium, in an amount to to provide a molar ratio of Mg:OH of 1.0 to 1.8
   (iii) tetraethyl orthosilicate, in an amount to provide a tetraethyl orthosilicate:Mg molar ratio of 0.50 to 0.80;
   (iv) and TiCl$_4$, in an amount to provide a molar ratio of Ti:Mg of 0.7 to 1.4 wherein the catalyst precursor has a K value, which is defined as $$K = \frac{[Ti]}{[Mg] + 4[Si]},$$

wherein is titanium metal concentration provided by TiCl$_4$, is magnesium metal concentration provided by said dibutylmagnesium; is the concentration provided by said tetraethyl orthosilicate, and K is 0.23 to 0.31; wherein concentration of each of, and is in units of mmole/gram silica support; and wherein the precursor is prepared at a temperature in the range of 40° to 65° C.; and wherein the cocatalyst is triethylaluminum.

4. The catalyst of claim 3, wherein the precursor is formed by the steps comprising (a) providing a slurry of silica, in a non-polar solvent, wherein the silica has 0.4 to 0.9 mmoles of OH groups per gram of silica;
   (b) contacting said silica with said dibutylmagnesium in an amount to provide a molar ratio of Mg:OH of 1.0 to 1.8, to impregnate said silica, and to form a step (b) product slurry;
   (c) adding, to said step (b) product slurry, tetraethyl orthosilicate, in an amount to provide a tetraethyl orthosilicate:Mg molar ratio of 0.50 to 0.80, and to form a step (c) product slurry;
   (d) contacting said step (c) product slurry with TiCl$_4$, in an amount to provide a molar ratio of Ti:Mg of 0.7 to 1.4 to form said catalyst precursor; wherein each of (b), (c) and (d) is undertaken at a temperature in the range of 40° to 65° C.

5. A catalyst composition for copolymerizing ethylene and an alpha olefin of 3 to 10 carbon atoms, comprising a catalyst precursor and a trialkylaluminum cocatalyst to activate said catalyst precursor, wherein the precursor comprises (i) silica, wherein the silica has 0.4 to 0.9 mmoles of OH groups per gram of silica;
   (ii) dibutylmagnesium, in an amount to provide a molar ratio of Mg:OH of 1.0 to 1.8;
   (iii) tetraalkyl orthosilicate, in an amount to provide a tetraalkyl orthosilicate:Mg molar ratio of 0.50 to 0.80 in which the alkyl group contains 2 to 6 carbon atoms;
   (iv) and TiCl$_4$, in an amount to provide a molar ratio of Ti:Mg of 0.7 to 1.4 wherein the catalyst precursor has a K value, which is defined as $$K = \frac{[Ti]}{[Mg] + 4[Si]},$$

wherein is titanium metal concentration provided by TiCl$_4$, is magnesium metal concentration provided by said dibutylmagnesium; is the concentration provided by said tetraalkyl orthosilicate, and K is less than 0.4 wherein concentration of each of, and is in units of mmole/gram silica support; and wherein the precursor is prepared at a temperature in the range of 40° to 65° C.

6. The catalyst of claim 5, wherein the K is in the range of 0.23 to 0.31.

7. The catalyst of claim 6, wherein the tetraalkyl orthosilicate is tetrabutyl orthosilicate.

8. The catalyst of claim 5, wherein the precursor is formed by the steps comprising
 (a) providing a slurry of silica, in a non-polar solvent, wherein the silica has 0.4 to 0.9 mmoles of OH groups per gram of silica;
 (b) contacting said silica with said dibutylmagnesium in an amount to provide a molar ratio of Mg:OH of 1.0 to 1.8, to impregnate said silica, and to form a step (b) product slurry;
 (c) adding, to said step (b) product slurry, tetraalkyl orthosilicate, in an amount to provide a tetraalkyl orthosilicate:Mg molar ratio of 0.50 to 0.80, and to form a step (c) product slurry;
 (d) contacting said step (c) product slurry with TiCl$_4$, in an amount to provide a molar ratio of Ti:Mg of 0.7 to 1.4 to form said catalyst precursor; wherein each of (b), (c) and (d) is undertaken at a temperature in the range of 40 to 65° C.

9. A catalyst composition for copolymerizing ethylene and an alpha olefin of 3 to 10 carbon atoms, comprising a catalyst precursor and a trialkylaluminum cocatalyst to activate said catalyst precursor, wherein the precursor comprises
 (i) silica, wherein the silica has 0.4 to 0.9 mmoles of OH groups per gram of silica;
 (ii) a dialkylmagnesium compound, R$_m$MgR'$_n$ wherein each of R and R' is an alkyl group of 4 to 10 carbon atoms, and wherein m plus n equal the valence of magnesium, wherein the dialkylmagnesium compound is present in an amount to provide a molar ratio of Mg:OH of 1.0 to 1.8,
 (iii) tetraethyl orthosilicate, in an amount to provide a tetraethyl orthosilicate:Mg molar ratio of 0.50 to 0.80;
 (iv) and TiCl$_4$, in an amount to provide a molar ratio of Ti:Mg of 0.7 to 1.4, wherein the catalyst precursor has a K value, which is defined as $$K = \frac{[Ti]}{[Mg] + 4[Si]},$$

wherein is titanium metal concentration provided by TiCl$_4$, is magnesium metal concentration provided by said R$_m$MgR'$_n$; is the concentration provided by said tetraethyl orthosilicate and K is less than 0.4 wherein concentration of each of, and is in units of mmole/gram silica support; and wherein the precursor is prepared at a temperature in the range of 40° to 65° C.

10. The catalyst of claim 9, wherein the K is in the range of 0.23 to 0.31.

11. The catalyst of claim 9, wherein the precursor is formed by the steps comprising
 (a) providing a slurry of silica, in a non-polar solvent, wherein the silica has 0.4 to 0.9 mmoles of OH groups per gram of silica;
 (b) contacting said silica with said dialkylmagnesium in an amount to provide a molar ratio of Mg:OH of 1.0 to 1.8, to impregnate said silica, and to form a step (b) product slurry;
 (c) adding, to said step (b) product slurry, tetraethyl orthosilicate, in an amount to provide a tetraethyl orthosilicate:Mg molar ratio of 0.50 to 0.80, and to form a step (c) product slurry;
 (d) contacting said step (c) product with TiCl$_4$, in an amount to provide a molar ratio of Ti:Mg of 0.7 to 1.4 to form said catalyst precursor; wherein each of (b), (c) and (d) is undertaken at a temperature in the range of 40° to 65° C.

12. A catalyst composition for copolymerizing ethylene and an alpha olefin of 3 to 10 carbon atoms, comprising a catalyst precursor and a trialkylaluminum cocatalyst to activate said catalyst precursor, wherein the precursor comprises
 (i) silica, wherein the silica has 0.4 to 0.9 mmoles of OH groups per gram of silica;
 (ii) a dialkylmagnesium compound, R$_m$MgR'$_n$ wherein each of R and R' is an alkyl group of 4 to 10 carbon atoms, and wherein m plus n equal the valence of magnesium, wherein the dialkylmagesium compound is present in an amount to provide a molar ratio of Mg:OH of 1.0 to 1.8;
 (iii) tetraalkyl orthosilicate, in an amount to provide a tetraalkyl orthosilicate:Mg molar ratio of 0.50 to 0.80, wherein the alkyl group contains 2 to 6 carbon atoms;
 (iv) and TiCl$_4$, in an amount to provide a molar ratio of Ti:Mg of 0.7 to 1.4, wherein the catalyst precursor has a K value, which is defined as $$K = \frac{[Ti]}{[Mg] + 4[Si]},$$

wherein is titanium metal concentration provided by TiCl4, is magnesium metal concentration provided by said dialkylmagnesium; is the concentration provided by said tetraalkyl orthosilicate, and K is 0.23 to 0.31 wherein concentration of each of, and is in units of mmole/gram silica support; and wherein the precursor is prepared at a temperature in the range of 40° to 65° C.

13. The catalyst of claim 12, wherein the cocatalyst is triethylaluminum.

14. The catalyst of claim 13, wherein the tetraalkyl orthosilicate is tetraethyl orthosilicate or tetrabutyl orthosilicate.

15. The catalyst of claim 12, wherein the tetraalkyl orthosilicate is tetraethyl orthosilicate.

16. The catalyst of claim 12, wherein the precursor is formed by the steps comprising
 (a) providing a slurry of silica, in a non-polar solvent, wherein the silica has 0.4 to 0.9 mmoles of OH groups per gram of silica;
 (b) contacting said silica with said dialkylmagnesium in an amount to provide a molar ratio of Mg:OH of 1.0 to 1.8, to impregnate said silica, and to form a step (b)

product;

(c) adding to said step (b) product, tetraalkyl orthosilicate, in an amount to provide a tetraalkyl orthosilicate:Mg molar ratio of 0.50 to 0.80, and to form a step (c) product, in which the alkyl group is 2 to 6 carbon atoms;

(d) contacting said step (c) product with $TiCl_4$, in an amount to provide a molar ratio of Ti:Mg of 0.7 to 1.4 to form said catalyst precursor.

17. The catalyst of claim 16, wherein the cocatalyst is triethylaluminum.

* * * * *

UNITED STATES PATENT AND TRADEMARK OFFICE
CERTIFICATE OF CORRECTION

PATENT NO. : 5,470,812          Page 1 of 2
DATED      : November 28, 1995
INVENTOR(S) : Robert I. Mink et al.

It is certified that error appears in the above-indentified patent and that said Letters Patent is hereby corrected as shown below:

Col. 13, line 49, Claim 1, after "wherein" insert --(Ti)--.

Col. 13, line 50, Claim 1, before "is" insert --(Mg)--.

Col. 13, line 51, Claim 1, before "is" insert --(Si)--.

Col. 13, line 53, Claim 1, after "each of" insert --(Ti), (Mg) and (Si)-- and delete "and".

Col. 14, line 15, Claim 3, after "amount" delete "to".

Col. 14, line 27, Claim 3, after "wherein" insert --(Ti)--.

Col. 14, line 28, Claim 3, before "is" insert --(Mg)--.

Col. 14, line 29, Claim 3, before "is" insert --(Si)--.

Col. 14, line 31, Claim 3, after "each of" insert --(Ti), (Mg) and (Si)-- and delete "and".

Col. 15, line 8, Claim 5, after "wherein" insert --(Ti)--.

Col. 15, line 9, Claim 5, before "is" insert --(Mg)--.

Col. 15, line 10, Claim 5, before "is" insert --(Si)--.

Col. 15, line 12, Claim 5, after "each of" insert --(Ti), (Mg) and (Si)-- and delete "and".

Col. 15, line 61, Claim 9, after "wherein" insert --(Ti)--.

Col. 15, line 62, Claim 9, before "is" insert --(Mg)--.

UNITED STATES PATENT AND TRADEMARK OFFICE
CERTIFICATE OF CORRECTION

PATENT NO. : 5,470,812

DATED : November 28, 1995

INVENTOR(S) : Robert I. Mink et al.

It is certified that error appears in the above-indentified patent and that said Letters Patent is hereby corrected as shown below:

Col. 15, line 63, Claim 9, before "is" insert --(Si)--.

Col. 15, line 65, Claim 9, after "each of" insert --(Ti), (Mg) and (Si)-- and delete "and".

Col. 16, line 46, Claim 12, after "wherein" insert --(Ti)--.

Col. 16, line 47, Claim 12, before "is" insert --(Mg)--.

Col. 16, line 48, Claim 12, before "is" insert --(Si)--.

Col. 16, line 50, Claim 12, after "each of" insert --(Ti), (Mg) and (Si)-- and delete "and".

Signed and Sealed this

Sixteenth Day of April, 1996

BRUCE LEHMAN

Attest:

Attesting Officer

Commissioner of Patents and Trademarks